United States Patent [19]
Konegen et al.

[11] Patent Number: 5,725,432
[45] Date of Patent: Mar. 10, 1998

[54] CONSTANT VELOCITY UNIVERSAL BALL JOINTS WITH WINDOW SURFACES AND BALL SURFACES HAVING A DESIRED ROUGHNESS

[75] Inventors: Herbert Konegen, Rösrath; Peter Seigert, Lohmar; Hans Schreiber, Völklingen-Ludweiler; Frank Tenhumberg, Troisdorf, all of Germany

[73] Assignee: GKN Automotive AG, Lohmar, Germany

[21] Appl. No.: 710,863

[22] Filed: Sep. 23, 1996

[30] Foreign Application Priority Data

Sep. 23, 1995 [DE] Germany ............ 195 35 431.1

[51] Int. Cl.⁶ .................................... F16D 3/223
[52] U.S. Cl. ............................ 464/145; 464/906
[58] Field of Search .......................... 464/145, 906, 464/146

[56] References Cited

FOREIGN PATENT DOCUMENTS 42 00 848 C1  6/1993  Germany.

*Primary Examiner*—Daniel P. Stodola
*Assistant Examiner*—Emmanuel M. Marcelo
*Attorney, Agent, or Firm*—Harness, Dickey & Pierce, P.L.C.

[57] ABSTRACT

A constant velocity universal ball joint (1) has an outer part (2), an inner part (6) received therein, and a cage (11) arranged between the outer part (2) and inner part (3) to guide balls (17) which serves to transmit torque between the outer part (2) and inner part (6). The balls (17) are guided between parallel window faces (15, 16) of the cage (11). To improve the service life values and the running-in conditions of the joint, balls (17) are used whose surface is ground and have a defined roughness. Thus, in the case of tolerance errors, the window faces (15, 16) are worked off to such an extent as to achieve identical load bearing conditions at the balls.

8 Claims, 2 Drawing Sheets

CONSTANT VELOCITY UNIVERSAL BALL JOINTS WITH WINDOW SURFACES AND BALL SURFACES HAVING A DESIRED ROUGHNESS

BACKGROUND OF THE INVENTION

The invention relates to a constant velocity universal ball joint. An outer part has a first longitudinal axis which constitutes the rotational axis of the outer part. Also, the outer part includes a cavity defined by an inner face which has outer tracks distributed around the longitudinal axis. An inner part has a longitudinal axis which constitutes the rotational axis of the inner part. The inner part is accommodated in the cavity of the outer part and is pivotable in all directions around the joint articulation center. The inner part outer face includes inner tracks. The outer tracks and the inner tracks form opposed pairs and each pair accommodates a torque transmitting ball. A cage is arranged between the inner face of the outer part cavity and the outer face of the inner part. The cage includes windows which are distributed in accordance with the pairs of outer and inner tracks. Also, the cage windows guide the balls between spaced window faces and support the balls during torque transmission on at least one each of the window faces.

Constant velocity universal ball joints are known to be provided with balls with a lapped or polished surface. It is common practice to use balls according to DIN 5401 Part I of class G20 whose surface roughness parameter $R_a$ (to DIN 4768) amounts up to a maximum of 0.032 μm. According to Roloff/Matek: Maschinenelemente (11th edition 1987, publishers: Friedrich Vieweg & Sohn, Braunschweig/Wiesbaden), this corresponds to a surface roughness parameter $R_z$ of approx. 0.16 μm maximum. The outer tracks of the outer part of the constant velocity universal ball joint and/or the inner tracks of the inner part of same have an end condition which is achieved by a chip-forming production method (e.g. by broaching, milling, grinding) or by a non-chip producing forming operation. This also applies to the cage and the cage window faces guiding the balls.

It has been found that the service life of a constant velocity universal ball joint, to a considerable extent, depends on the running-in conditions of the new joint. During the running-in phase the production-related track surface roughness is smoothed down, which is largely due to a plastic deformation of the roughness peaks. To ensure that the balls are carried in a uniform way, the production-related amounts of play between the individual ball and track contact faces need to be evened out. It has been found that the running-in process required for this purpose is affected both by, the lubricant used, and the prevailing surface roughness parameters when the ball and track contact one another. When using balls in accordance with the present state of the art, the running-in process cannot be sufficiently carried out in individual cases, thus causing early failure during service life tests.

In DE 40 37 734 A1 it is proposed, in respect of rolling contact bearings, to use rolling contact members which permit the formation of a thin oil film while, additionally, aiming at achieving a long service life of the rolling contact member independently of the surface with which the rolling contact member comes into contact (smooth or rough). For this purpose, all or some of the participating rolling contact surfaces of the outer bearing ring, the inner bearing ring and/or the rolling contact member are provided with minute recesses, with the surface ratio between the recesses and the entire rolling contact surface amounting to a value between 10% and 40%. According to the teaching of the publication, this results in an advantageous effect on the friction resistance because the formation of an oil film is improved on the rolling contact surfaces. The running-in process is not intended to be influenced by this process.

The measures described above in connection with DE 40 37 734 A1 are proposed in DE 41 13 944 A1 for the needles used to support a tripod roller and for the tripod roller of a tripod joint.

SUMMARY OF THE INVENTION

It is an object of the present invention to provide a constant velocity universal ball joint where, even with coarse tolerances, it is possible to achieve an improved service life while avoiding, or at least reducing the number of, cases of early failure.

In accordance with the invention, the objective is achieved by grinding the surface of the balls, a surface roughness parameter $R_z$ DIN of 0.5 to 3 μm (to DIN 4768, May 1990 edition) or $R_{ys}$ ISO of 0.5 to 3 μm (to ISO 4287/1: 1984, 1984 edition) and a hardness of 58 to 66 HRC. Further, the outer and inner tracks and the window faces of the cage are hardened to a hardness of 58 to 62 HRC (Rockwell). Preferably, they include a surface roughness parameter $R_z$ DIN of 1.5 to 2.5 or $R_{ys}$ ISO of also 1.5 to 2.5.

An advantage of such an embodiment is that the service life of constant velocity universal ball joints is improved considerably, with cases of early failure being largely avoided. This is due to the fact that the balls, with their ground surfaces, re-work the window faces of the cage between which the balls are guided. This is accomplished by any play resulting from production-related tolerances is largely evened out and the balls are able to assume a position in which, as far as possible, all balls have a carrying function. This leads to the further progression of wear at the individual ball/cage and ball/track contact faces being evened out. In addition, it has been found that during the wear process, the balls are smoothed down, which as a result reduces progression of wear. The structure of the outer and inner tracks is changed only insubstantially.

By changing the position of the balls in the cage windows, the load bearing conditions in the tracks are improved and become more uniform. By smoothing down the window faces, the point contact which exists before the running-in process is changed into a surface contact.

In a preferred embodiment, the balls are made of the standard rolling contact bearing steal to DIN 17230, especially of a material of grade 100Cr6 or 100CrMn6. As far as the outer part and/or the inner part is concerned, it is possible either to use an induction-hardenable carbon steel, for example a steel of grade Cf53 or a case-hardenable steel, preferably of grade SAE 8620. The cage, preferably, is of the above-mentioned materials.

From the following detailed description taken in conjunction with the accompanying drawings and subjoined claims, other objects and advantages of the present invention will become apparent to those skilled in the art.

BRIEF DESCRIPTION OF THE DRAWINGS

Two preferred constant velocity universal ball joints with ground balls in accordance with the invention are diagrammatically illustrated in the drawing and explained with reference thereto.

DETAILED DESCRIPTION OF THE DRAWINGS

Figure 1:
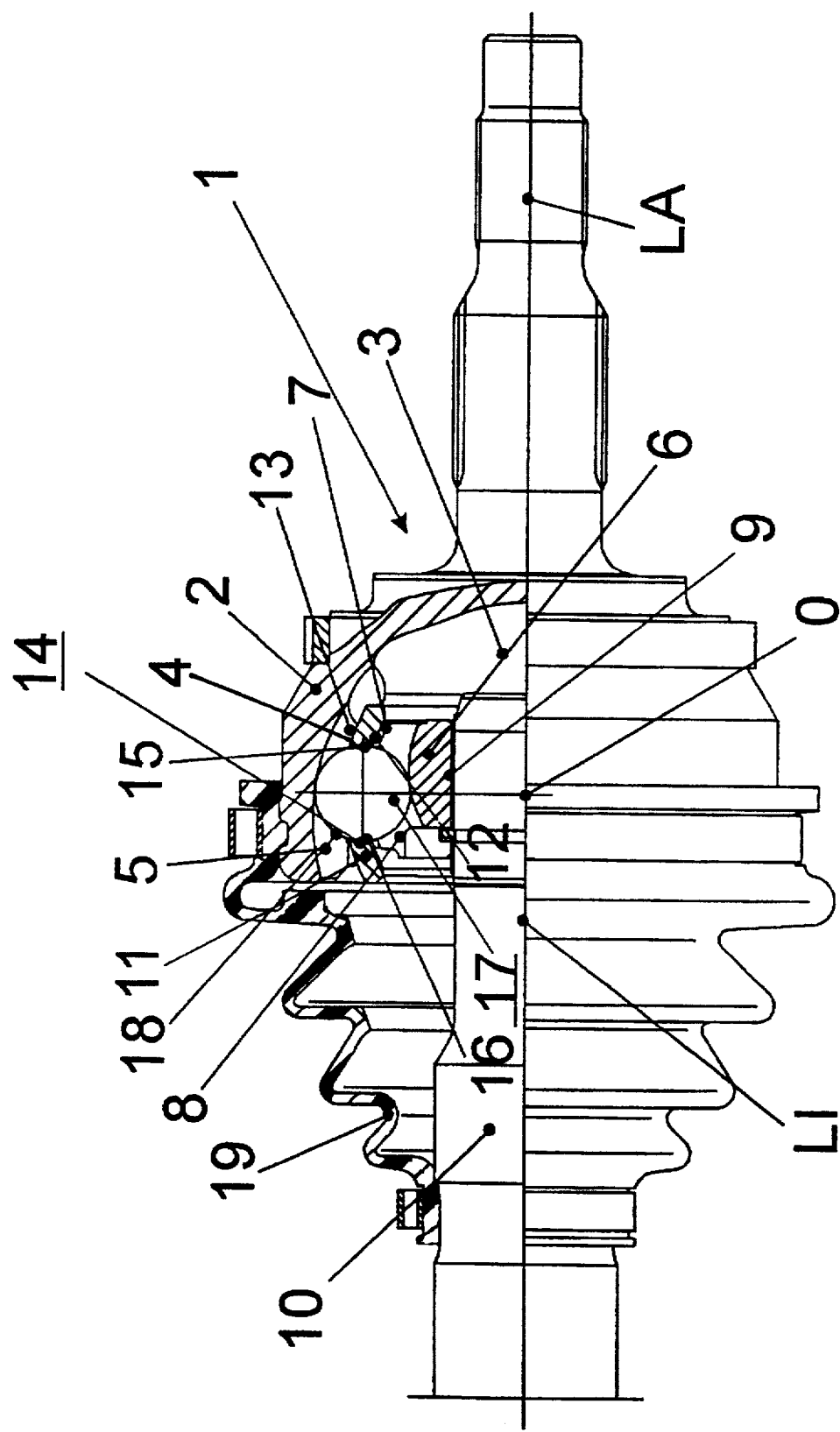
FIG. 1 is a longitudinal section view through a constant velocity universal ball joint in the form of a fixed joint.

A longitudinal section view of a fixed joint 1 is shown in FIG. 1. The joint 1 includes an outer part 2 with a longitudinal axis which is designated with the reference letters LA. The longitudinal axis constitutes the rotational axis of the outer part 2. The outer part 2 has a journal which is connected to a driving or driven component. The outer part 2 includes a cavity 3 with an inner face 4 in the form of the partial face of a hollow sphere. The inner face 4 includes outer tracks 5 distributed around the longitudinal axis LA and which are in planes extending parallel to the longitudinal axis LA. The track base of the outer tracks 5 is substantially formed by a circular arch which, relative to the joint articulation center O on the longitudinal axis LA, is laterally offset or extends parallel thereto.

An inner part 6 is received in the cavity 3 of the outer part 2. The inner part 6 defines a longitudinal axis LI which forms the rotational axis of the inner part. The outer face 7 of the inner part 6 is shaped like a spherical zone. The outer face includes inner tracks 8 which oppose the outer tracks 5. The inner tracks 8 include a track base which is also arranged in the form of a circular arch around a center which is also offset relative to the joint articulation center O in a direction opposite to that of the respective center for the outer tracks 5. The inner and outer tracks are arranged to form pairs of outer tracks 5 and inner tracks 8. The pairs each accommodate a torque transmitting ball 17.

A cage 11 guides the balls 17. The cage 11 is arranged between the inner face 4 of the cavity 3 of the outer part 2 and the outer face 7 of the inner part 6. The cage 11 is preferably guided, in a surface to surface contact way, by its outer face 13 on the inner face 4 of the outer part 2 and by its inner face 12 on the outer face of the inner part 6.

The balls 17, in their ball centers, are to be held by the cage 11 in a plane extending perpendicularly relative to the drawing plane and through the joint articulation center O, the plane being the so-called constant velocity plane. The cage 11 includes windows 14 to guide the balls 17. The windows 14 have window faces 15, 16 which extend parallel relative to one another and parallel relative to the constant velocity plane. The balls 17 are guided between the window faces 15, 16 and project radially inwardly and outwardly from the windows 14.

The surface 18 of the balls 17 is ground, with the surface roughness parameter $R_z$ DIN amounting to 1 to 3 μm and $R_{y5}$ ISO also amounting to 1 to 3 μm.

When torque is transmitted and when the inner part 6 is articulated relative to the outer part 2, the balls 17 are subjected to forces which urge the balls 17 in the direction towards one of the window faces 15, 16. If, as a result of the production tolerances for example, not all the balls 17 include the same amount of play between the tracks associated with the balls, one or several balls 17 will be subjected to greater loads. This means that not all the balls 17 participate, to the same extent, in the transmission of torque. On the other hand, this also means that individual balls and also the associated outer tracks 5 and inner tracks 8 are overloaded. However, because of the ground surface 18 and as a result of the relative movement between the window faces 15, 16 and the ball surface 18 of the balls 17 subjected to greater loads, the latter, upon articulation and rotation of the joint, are subject to a relative movement which, because of the rougher surface 18 of the balls 17, leads to working off the window faces 15, 16 subjected to greater loads. As a result of the working off of the window faces 15, 16, the ball positions are changes until all balls 17 participate uniformly in the transmission of torque. This leads to a considerable improvement in service life properties.

The space between the outer part 2 and an intermediate shaft 10 inserted into the bore 9 of the inner part 6 is covered by a convoluted boot 19. The interior of the boot 19 and the remaining part of the cavity 3 not filled by the balls 17, the cage 11 of the inner part 6 is at least partially filled with a lubricant.

Figure 2:
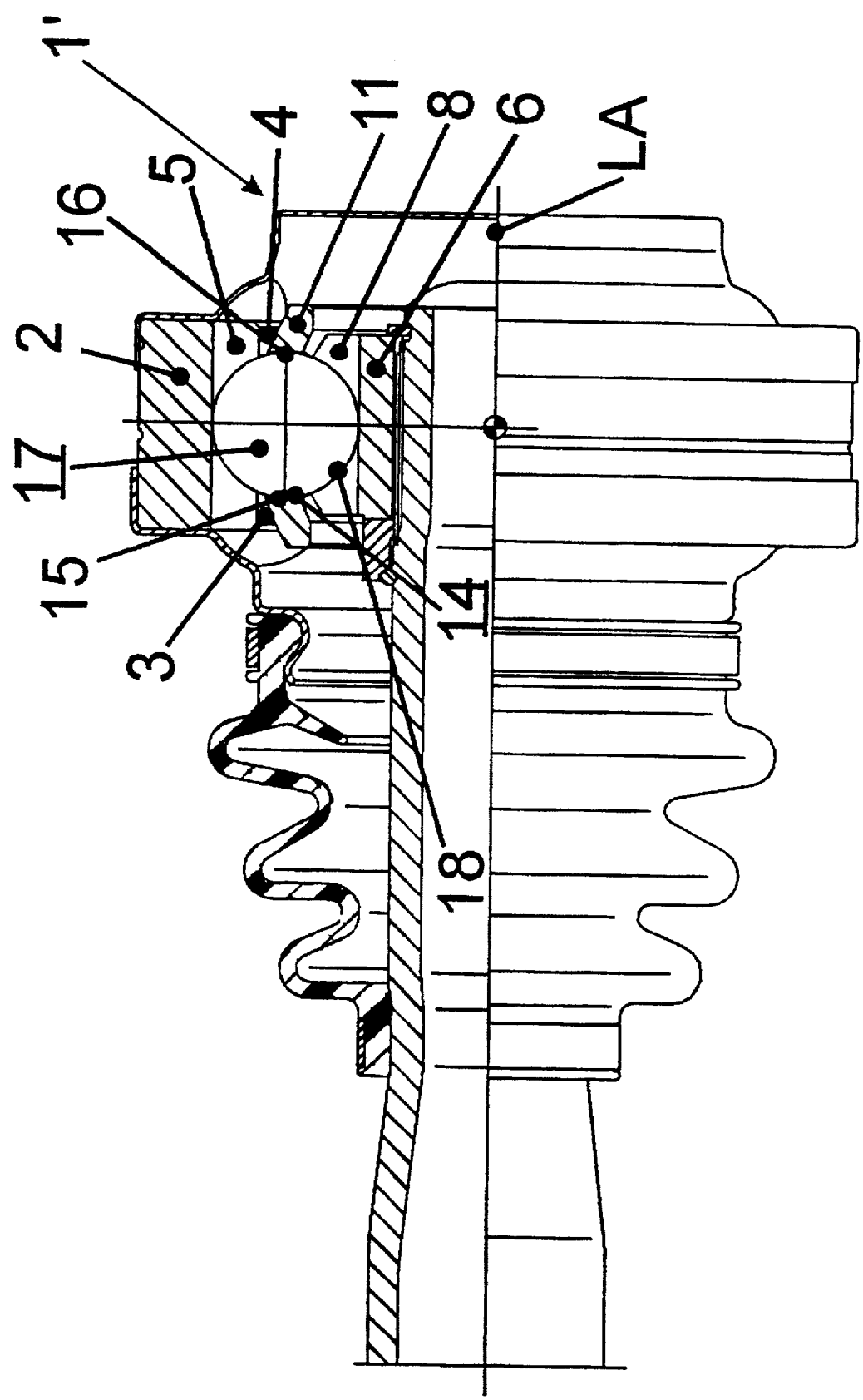
FIG. 2 is a longitudinal section view through a constant velocity universal ball joint in the form of a plunging joint.

The above-described joint 1 is a fixed joint which forms part of a sideshaft and is associated for example with the driven wheels of a motor vehicle, with a plunging joint preferably being arranged on the opposed side of the gearbox. Such a commonly used constant velocity universal ball joint in the form of a plunging joint is illustrated in FIG. 2 and explained with reference thereto. In addition to the embodiments shown in FIGS. 1 and 2, there are other species of constant velocity universal ball joints in the form of fixed or plunging joints to which the above-described principles constituting the contents of the invention also apply.

The joint according to FIG. 2 is a so-called constant velocity universal ball VL joint (joint 1') which permits plunging movements between the outer part 2 and inner part 6 as well as articulation between the parts. In the case of the joint 1', the outer part 2 includes a substantially cylindrical cavity 3 with an inner face 4 which includes outer tracks 5. The outer tracks 5 are distributed around the longitudinal axis LA. Two types of outer tracks 5 are provided which, while starting from the two open ends, alternately approach, and move away from, one another. The inner tracks 8 of the inner part 6 are arranged such that each inner track 8 intersects the associated outer track 5.

A ball 17 is arranged at the point of intersection between an inner track 8 and an outer track 5. The balls 17 are held in windows 14 of a cage 11 and are guided by spaced window faces 15, 16. The intersecting tracks 5, 8 with the help of the cage 11, guide the balls 17 into the constant velocity plane, but again production tolerances may cause certain amounts of play which are offset by the surface 18 of the balls 17 working off the window faces 15, 16.

If the joint is in the aligned condition as illustrated, with the inner and outer part at a 0° position, and when the inner part 6 is articulated relative to the outer part 2, the intersection between the tracks 5, 8 causes the balls 17 to be subjected to forces in such a way that one half of the balls 17 is pushed into contact with the window faces 15, whereas the other half of the number of balls 17 is pushed into the opposite direction towards the window faces 16. The balls 17 subjected to the highest loads during the running-in phase continue to work off the window faces 15 or 16 contacted by the balls until virtually all balls 17, as well as the outer tracks 5 and inner tracks 8, participate in the transmission of torque to the same extent.

While the above detailed description describes the preferred embodiment of the present invention, the invention is susceptible to modification, variation and alteration without deviating from the scope and fair meaning of the subjoined claims.

We claim:

1. A constant velocity universal ball joint comprising:
    an outer part which defines a first longitudinal axis constituting a rotational axis of the outer part, a cavity in the outer part defining an inner face with outer tracks distributed around the longitudinal axis;

an inner part defining a longitudinal axis constituting a rotational axis of the inner part, said inner part accommodated in the cavity of the outer part so as to be pivotable in all directions around a joint articulation center, an outer face in said inner part includes inner tracks;

the outer tracks and the inner tracks forming opposed pairs;

torque transmitting balls accommodated in said opposed pairs;

a cage arranged between the inner face of the cavity of the outer part and the outer face of the inner part, windows in said cage, said windows being distributed in accordance with the pairs of outer and inner tracks and said bails in said windows and guided between spaced window faces (15, 16) and supported during the transmission of torque on at least one of said window faces and surfaces of the balls being ground and including a surface roughness parameter $R_z$ DIN of 0.5 to 3 µm or $R_{y5}$ ISO of 0.5 to 3 µm and a hardness of 58 to 66 HRC and said outer and inner tracks and said window faces of the cage are hardened to a hardness of 58 to 62 HRC.

2. A constant velocity universal ball joint according to claim 1, wherein the balls are rolling contact bearing steel, wherein the material is selected from the group comprising 100Cr6 and 100CrMn6 and combinations thereof.

3. A constant velocity universal ball joint according to claim 1, wherein the outer part and the inner part are an induction-hardenable carbon steel.

4. A constant velocity universal ball joint according to claim 3, wherein the carbon steel is provided in the form of a steel of grade Cf53.

5. A constant velocity universal ball joint according to claim 1, wherein the outer part and the inner part (6) are a case-hardenable steel.

6. A constant velocity universal ball joint according to claim 5, wherein the case-hardenable steel is a steel of grade SAE 8620.

7. A constant velocity universal ball joint according to claim 1, wherein the outer part or the inner part are an induction-hardenable carbon steel.

8. A constant velocity universal ball joint according to claim 1, wherein the outer part or the inner part (6) are a case-hardenable steel.

* * * * *